US008145901B2

(12) United States Patent
Lakshmi Narayanan

(10) Patent No.: US 8,145,901 B2
(45) Date of Patent: *Mar. 27, 2012

(54) SYSTEM AND METHOD FOR NODES COMMUNICATING IN A SHARED NETWORK SEGMENT

(75) Inventor: Ram Gopal Lakshmi Narayanan, Woburn, MA (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,043

(22) Filed: Jul. 19, 2010

(65) Prior Publication Data

US 2010/0284402 A1 Nov. 11, 2010

Related U.S. Application Data

(63) Continuation of application No. 10/648,770, filed on Aug. 27, 2003, now Pat. No. 7,774,597.

(60) Provisional application No. 60/482,762, filed on Jun. 27, 2003.

(51) Int. Cl.
*H04L 29/06* (2006.01)
(52) U.S. Cl. ............................ 713/163; 380/278; 380/44
(58) Field of Classification Search ........................ None
See application file for complete search history.

(56) References Cited

U.S. PATENT DOCUMENTS

| 6,085,320 | A | 7/2000 | Kaliski, Jr. |
| 6,751,729 | B1 | 6/2004 | Giniger et al. |
| 7,103,185 | B1 | 9/2006 | Srivastava et al. |
| 2002/0016926 | A1 | 2/2002 | Nguyen et al. |

OTHER PUBLICATIONS

Network Working Group, Internet Draft, "Flaws in Packet's Authentication of OSPFv2," J. Etienne, May 9, 2001.
Moy, "OSPF Version 2 (Std. 54)," RFC 2328, Apr. 1998, XP002175571.
Murphy et al.; "Digital Signature Protection of the OSPF Routing Protocol," Network and Distributed System Security, 1996, Proceedings of the Symposium on San Diego, CA, IEEE Comput. Soc. US, Feb. 22, 1996, pp. 93-102.
Hauser et al.; "Reducing the Cost of Security in Link-state Routing," Network and Distributed System Security, Feb. 1997, IEEE Computer, pp. 93-99, XP010216166.
Etienne, "Anti Replay Authentication," Internet Draft, May 2001, pp. 1-15, XP002289216.
Kent, S., et al., "Security Architecture for the Internet Protocol," Network Working Group; Nov. 1998, pp. 1-62.
Moy, John T., "OSPF: Anatomy of an Internet Routing Protocol," ISBN: 0201634724; 1998.
Huitema, Christian, "Routing in the Internet," 2nd Edition, ISBN: 0-13-022647-5; 1995.
Menezes et al., "Handbook of Applied Cryptography," 1997, CRC Press, pp. 25-32.
Schneier, "Applied Cryptography," 1996, John Wiley & Sons, 2nd Edition, pp. 31-34.

(Continued)

*Primary Examiner* — Minh Dinh

(57) ABSTRACT

The invention provides a method and system for a network which includes a plurality of nodes, preferably routers, a shared network segment for communication between the nodes, and several multicast channels in the shared network segment on which the nodes, preferably routers, can send multicast messages to the other nodes. A specific multicast channel is provided on which the nodes can send specific start multicast messages to other nodes, wherein a node which starts a protocol application, preferably a routing protocol application such as Open Shortest Path First (OSPF) protocol, is adapted to send a multicast start message on the specific multicast channel. Another node, preferably a router, receiving this start message is adapted to validate the authenticity of the start message and to send a response message.

15 Claims, 4 Drawing Sheets

Jump-start and group re-keying process

OTHER PUBLICATIONS

Harney et al., "RFC 2094—Group Key Management Protocol (GKMP) Architecture," Jul. 1997, Retrieved from the Internet on Jan. 14, 2007; <URL: http://www.faqs.org/rfcs/rfc2094.html>.

Maughan et al., "RFC 2408—Internet Security Association and Key Management Protocol (ISAKMP)," Nov. 1998, retrieved from the internet on Jan. 14, 2007: ,URL: http://www.faqs.org/rfcs/rfc2408.html>.

Antoine et al., "Router Security Configuration Guide," Sep. 2002, retrieved from the internet on Jan. 14, 2007: <URL: http://nsa2.www.conxion.com/disco/guides/cis-2.pdf>.

Papadimitratos et al., "Securing the Internet Routing Infrastructure," IEEE, Oct. 2002, retrieved from the internet on Jan. 14, 2007: <URL: http://ieeexplore.ieee.org/iel5/35/22296/01039858.pdf?tp=&amember=1039858&isnumber=22.

Dierks, T. et al., "The TLS Protocol," Networking Group, Jan. 1999, pp. 1-75.

Examination Report issued on EP Application 04733871.0, mailed Aug. 25, 2008.

Final Office Action on U.S. Appl. No. 10/648,770, mailed Oct. 16, 2008.

Final Office Action on U.S. Appl. No. 10/648,770, mailed Sep. 6, 2007.

International Preliminary Report on Patentability for PCT/IB2004/001622, issued Jan. 3, 2006.

International Search Report for PCT/IB2004/001622, mailed Aug. 2, 2004.

Non-Final Office Action on U.S. Appl. No. 10/648,770, mailed Feb. 21, 2007.

Non-Final Office Action on U.S. Appl. No. 10/648,770, mailed Feb. 25, 2008.

Non-Final Office Action on U.S. Appl. No. 10/648,770, mailed Aug. 7, 2009.

Notice of Allowance on U.S. Appl. No. 10/648,770, mailed Mar. 19, 2010.

OSPF message exchange in shared segment

Jump-start and group re-keying process

JUMP-START PACKET

SESSION KEY UPDATE PACKET

| Source IP Address = DR |
| Destination IP Address = BDR |
| Message Type = Session key update |
| Time Stamp |
| Session Key |

FIG. 4A

SESSION KEY UPDATE ACKNOWLEDGMENT PACKET

| Source IP Address = BDR |
| Destination IP Address = DR |
| Message Type = Session key ACK |
| Time Stamp |

FIG. 4B

FIG. 4
SESSION KEY UPDATE PACKET,
SESSION KEY UPDATE ACK PACKET

SYSTEM AND METHOD FOR NODES COMMUNICATING IN A SHARED NETWORK SEGMENT

CROSS-REFERENCE TO RELATED APPLICATIONS

This application is a Continuation Application of U.S. application Ser. No. 10/648,770, filed Aug. 27, 2003, which claims the benefit of priority of provisional patent application Ser. No. 60/482762 entitled, "System and Method for Nodes, Preferably Routers, Communicating in a Shared Network Segment," filed Jun. 27, 2003, the entire contents of which are incorporated herein by reference.

BACKGROUND OF THE INVENTION

1. Field of the Invention

The invention relates to a mechanism, that is a system and method, for breaking live lock and supporting group keying and re-keying in routing system of networks, in particular IP based networks such as the Internet.

2. Description of the Related Art

Routing protocols exchange network-prefixes (routes) during their routing update process. Commonly used deployed routing protocols are Open Shortest Path First (OSPF), Routing Information Protocol (RIP), Intermediate system and Intermediate Systems (IS-IS) for intra-domain routing and Border Gateway Protocol (BGP) for inter-domain routing. A recommended intra-domain routing protocol is OSPF; it uses both multicast and unicast channels for their update and flooding process. None of the routing protocols are designed with inbuilt security mechanism. For OSPF, security extensions were added later. These security extensions were not widely used due to lack of automatic mechanism and deployment issues. For example no automatic re-keying is provided for, and MD5 (Message Digest 5) which is now being used for authentication in OSPFv2 does not provide adequate security. Deployments are based on manual keying that leads to problems especially against replay attacks such as described in an article by Jerome Etienne, "Flaws in packet's authentication of OSPFv2", IETF Internet-Draft, "http://off.net/~jme/ietf/draft-etienne-ospfv2-auth-flaws-00.html". Group keying and multicast security are still open security problems.

Routing protocols like OSPF use multicast and unicast protocols for exchanging LSA (Link State advertisements). OSPF supports three different mechanisms to use security extensions, namely no security at all, security-using password based scheme, or cryptographic checksum based on Message Digest 5 (MD5) for authentication. MD5 authentication provides higher security than plain text authentication. MD5 authentication uses a key ID that allows the router to reference multiple passwords, making password migration easier and more secure.

OSPFv3 (OSPF version 3) does not have fields for security. When OSPFv3 is run on top of IPv6, all the security mechanisms to IPv6 are leveraged. Routing tables for OSPFv2 (version 2) and OSPFv3 are separate and they do not share anything in common. For IPv6 Authentication header is mandatory, IPv6 expects some mechanism to be present for establishing the Security Association (SA) and applying the SA credentials to the flows. It may use Internet Protocol security/Internet Key Exchange (IPsec/IKE) or any other security protocol to provide keys and SA information's.

OSPF uses multicast on a shared segment to reduce the traffic overhead, and uses point-to-point communication for non-shared segment or network. For IPv6 authentication is mandatory, yet currently there is no defined scheme to perform secured group communication. Moreover in OSPF the problem expands in different directions on shared network as follows:

First, OSPF routers are supposed to send a "hello" packet to their neighboring peers in multicast channel. The hello packet is used to inform the neighboring routers and to perform a discovery process, and needs also to be authenticated. This creates a problem. Before sending the packet, OSPF routers need the keys and credentials to generate and authenticate the packets.

The problem is that the OSPF routers should know in advance whom all the other OSPF routers in the same segment are and what keys to be used to authenticate their packets. This is a so-called live lock situation. A hello message is the only way for an OSPF node to advertise that it is an OSPF node and wants to participate in the OSPF protocol. Only legitimate routers are supposed to send hello packets and to participate in the OSPF protocol.

A further problem is how should the OSPF routers create the SA's (Security Associations) for inbound and outbound traffic when they do not know their neighbors.

OSPF routers, after receiving hello packet from the neighbors, will cooperatively perform designation router and backup designation routers selection process. All these messages have to be authenticated. This is currently performed by manual keying. The messages are pre-configured and the operations are made. OSPF supports very little resistance against replay protection and with manual keying there is no replay protection with IPv6/IPv4. OSPF is an interior routing protocol and is used internally within a single administrative domain. To detect internal attacks, Intrusion Detection Systems are deployed at hot-spots with high traffic. Since OSPF is with a domain, the only way to defeat against such attack is by placing Intrusion detection systems on all the segments but it may be costly for network operator to modify almost every routing element.

A structure in accordance with the above description is shown in, and described with regard to FIG. 1. FIG. 1 illustrates OSPF message exchange in shared segment. Routers R1 to R6 are routers connected in a shared LAN. The routers may be a Designated Router (DR) and a Backup Designated Router (BDR). As shown in FIG. 1, router R6 sends a hello packet, or/and it may send router LSA update message in multicast channel. The designated router DR provides the summary LSA in another multicast address which all the OSPF routers R1 to R6 in the LAN will receive. The backup designated router BDR becomes active when designated routers DR fail. OSPFv3 leverages all authentication mechanism to IPv6. Currently there is no automatic support for secured group communication and how to authenticate the OSPF packets. Due to these shortcomings, there is insufficient security.

OSPFv2 and OSPFv3 are proposed to perform manual keying for authenticating routers/nodes. This has several severe limitations. For example, there is no provision of automatic re-keying, no replay protection, and there is no way to make sure that only OSPF legitimate nodes are exchanging the hello protocol message.

SUMMARY OF THE INVENTION

The invention provides a method and communication system which includes a plurality of nodes, preferably routers, communicating in a shared network segment. At least one multicast channel in the shared network segment on which the nodes, preferably routers, can send multicast messages to the other nodes. A further specific multicast channel is provided on which the nodes can send specific start multicast messages to other nodes. A node which boots up or starts a protocol application, preferably a routing protocol application, sends a multicast start message on the specific multicast channel. Another node, preferably a router, receiving this start message validates the authenticity of the start message and may send a response message.

According to another embodiment, a method performed in a communication system including a plurality of nodes communicating in a shared network segment and at least one multicast channel in the shared network segment, is provided. The method includes a step of sending multicast messages from nodes on at least one multicast channel to other nodes. The method includes a step of providing a further specific multicast channel for sending start messages by the nodes to the other node. The method also includes a step of sending a start message on the specific multicast channel by using a start node, wherein the start node starts an operation or an application. The method further includes the steps of receiving at a receiving node the start message, and validating an authenticity of the start message upon receipt of the start message at the receiving node.

According to a further embodiment, a communication system is provided. The communication system includes a plurality of nodes, and a shared network segment for communication between nodes of the plurality of nodes. The communication system also includes at least one multicast channel in the shared network segment on which the nodes can send multicast messages to other nodes, and a specific multicast channel on which the nodes can send start messages to the other nodes. The communication system further includes a start node for starting an operation or an application configured to send a start message on the specific multicast channel, and a receiving node for receiving the start message configured to validate an authenticity of the start message.

According to another embodiment, a node for use in a system including at least one multicast channel on which the node can send multicast messages to other nodes is provided. The node is configured to send a start message on a specific multicast channel of a system when the node starts an operation or an application.

Compared to the solutions that are based on the Public Key Infrastructure (PKI), one of the advantages provided the invention is that it does not involve any infrastructure. In addition, the public key infrastructure, PKI, method takes a longer time to implement until it becomes fully operational.

Another advantage is that the invention does not need to change the OSPF protocol. It is not restricted to OSPF alone. It can be used where any group communication is required. It serves as a keying/rekeying framework to the existing application. The invention provides a mechanism among the routing elements that needs only initial kick-start, afterwards the routing elements self-stabilize, authenticate and validate each other by themselves. Operator intervention is not necessary. The invention does not need manual keying and provides appropriate solution for mobile routers.

BRIEF DESCRIPTION OF THE DRAWINGS

The objects and features of the invention will be more readily understood with reference to the following description and the attached drawings, wherein:

FIG. 4 illustrates parts of a session key update message, in particular of the header of a session key update message, and of a session key update acknowledgment message according to an embodiment of the invention.

DETAILED DESCRIPTION OF THE PREFERRED EMBODIMENTS

Embodiments of the invention provide a system and method allowing to break live lock and being able to support group keying and re-keying in routing systems of communication systems and networks, in particular IP based networks.

Embodiments of the invention solve problems especially with regard to security problems such as group keying and multicast security. Further, these or other embodiments of the invention address the group keying and re-keying issues related to routing protocol infrastructure namely OSPF.

In more detail, the invention supports and provides a means and function to perform a jump-start for identifying the legitimate nodes that are willing to participate in group communication. The invention also supports and provides a mechanism and function to distribute the group-keys during a re-keying process. The invention further supports and provides a mechanism and function enabling nodes(s) to distribute and synchronize themselves during the re-keying process.

The invention provides several advantages. For example, the proposed Jump-start mechanism enables the OSPF nodes to exchange secret keys out-of-band. By providing such mechanism only legitimate nodes will participate in the OSPF routing protocol and each OSPF routers a priori knows the existence of other routers in the domain.

In the invention, designated router and back up designated router may become the caretaker for establishing and distributing the SA to other routers in the shared segment.

The embodiments provide some advantageous features on the start-up sequence for the OSPF process to perform automatic group keying and re-keying.

The invention not only applies to OSPF routers. The invention can also be applied to any form of group communication where there are N (N>=1) server and M clients communicating in a shared (and also non-broadcast) segment.

Figure 1:
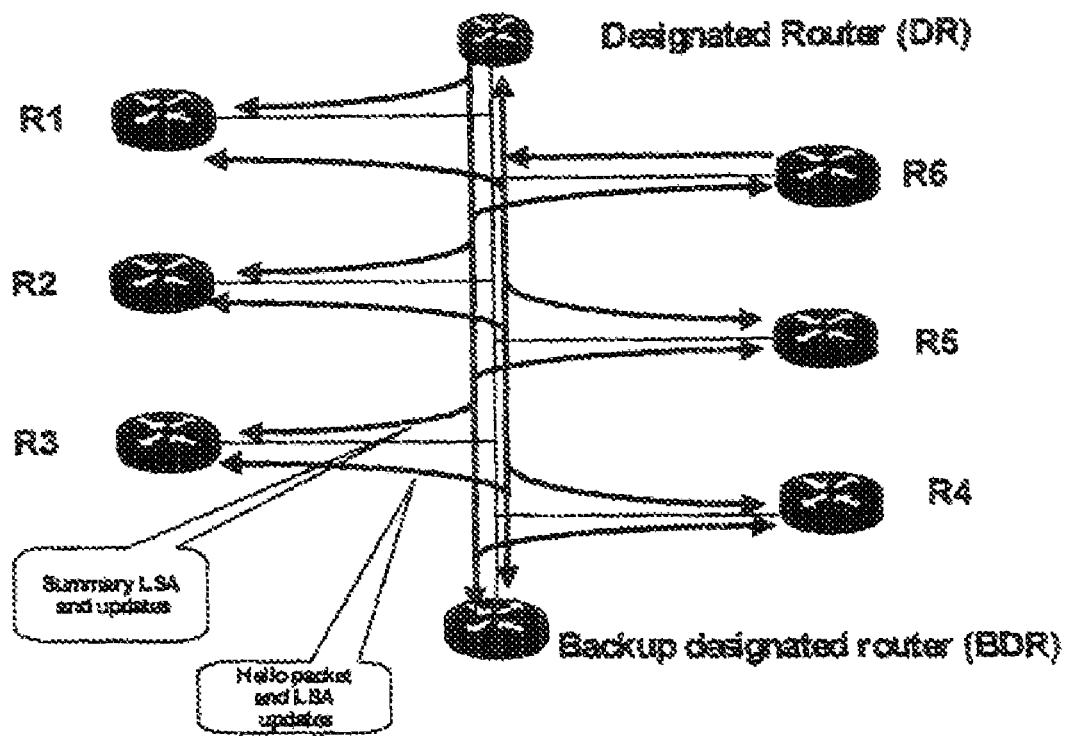
FIG. 1 illustrates OSPF message exchange in shared segment comprising several routers.
Figure 2:
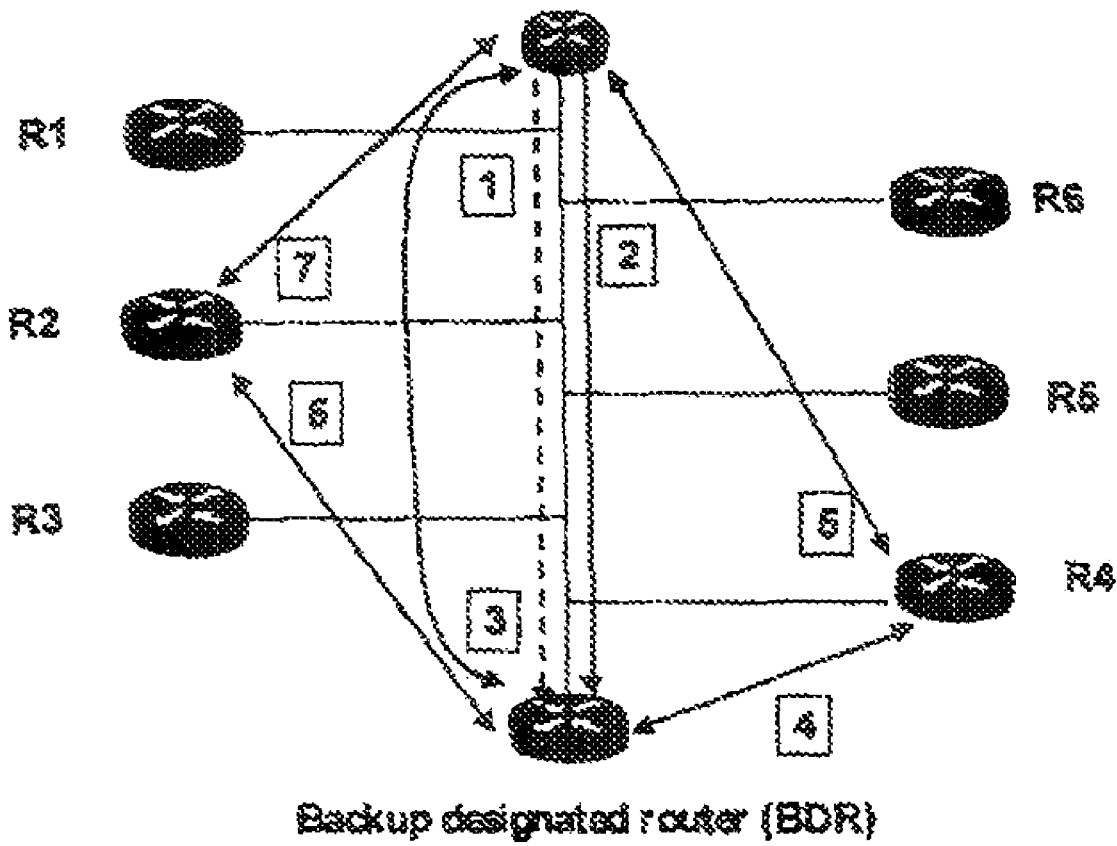
FIG. 2 shows an embodiment of the invention which includes a mechanism and functions for the jump-start, group keying and re-keying processes.

FIG. 2 shows an embodiment of the invention which provides a jump-start mechanism and function, and a group keying and re-keying process. FIG. 2 illustrates the OSPF message exchange in the shared segment. Routers R1 to R6 are routers connected in a shared LAN, the DR is a designated router and the BDR is a backup designated router.

First, the jump-start mechanism will be described. The jump-start means and function is based on the fact that the OSPF node listens on the third multicast "start-up" channel. The other two multicast channels are used by the OSPF for exchanging hello packet and LSA summary. If the node did not receive any message on the "start-up" channel, then it sends a "jump-start" message signed by its private key. By receiving these "jump-start" messages, the nodes can detect other available nodes in the segment.

The invention, according to one embodiment which provides secure OSPF signaling, may be based on the use of IPsec SAs (Security Association) that are setup as a result of initial signaling between the nodes. The router may begin with a jump-start mechanism instead of sending out its Hello packets. This may be implemented by a change to the state machine of the routing protocol. Further details of the jump-start mechanism is described below.

Before sending an initiating message, e.g. a hello packet, each OSPF router R1 to R6 has to know what keys and credentials have to be applied to the hello packet. For OSPF, hello packet is normally the first message generated by the OSPF nodes so there is no way to find out the other legitimate nodes in the current OSPF shared segment. This is called a live lock situation, where the OSPF routers want to send the hello packet, but to generate hello packet OSPF, the OSPF routers have to know what keys and credentials to be applied to that packet so that other nodes can authenticate the hello packet. Current IPsec or other security mechanism looks for Security Parameter Index (SPI) and destination address. If there is no Security Association (SA) defined for the inbound traffic, the packets are discarded. It is the responsibility of the sending node to generate the SA before sending the packet to the network.

To solve this live lock problem, in at least one or more or all of the described embodiments of the invention when the OSPF application process is started, the hello packets are not, or need not be exchanged as the first packets. The OSPF process listens by monitoring on a (e.g. third) multicast channel which is referred to here as start-up channel. The other (e.g. two) multicast channels are used by OSPF for exchanging hello packets and LSA summary information.

Basically, the OSPF is an application process that runs on a router (node). For example when a router is powered on, the router bootups. Most of the time all the routing applications like OSPF, Routing Information Protocol (RIP) or Border Gateway Protocol (BGP) etc are started during the start-up time of the router. But it may be possible that the router can start the OSPF process at a later time. This will for instance be done when the administrator is performing some maintenance operation on the router. First the administrator might have stopped the running process and, after completing the maintenance procedure, the administrator can re-start the routing (OSPF) application by typing in a command at the router (node). In the described embodiments, it is hence the node or the process such as the OSPF process within the node which sends or receives the messages or listens to the channels etc.

Figure 3:
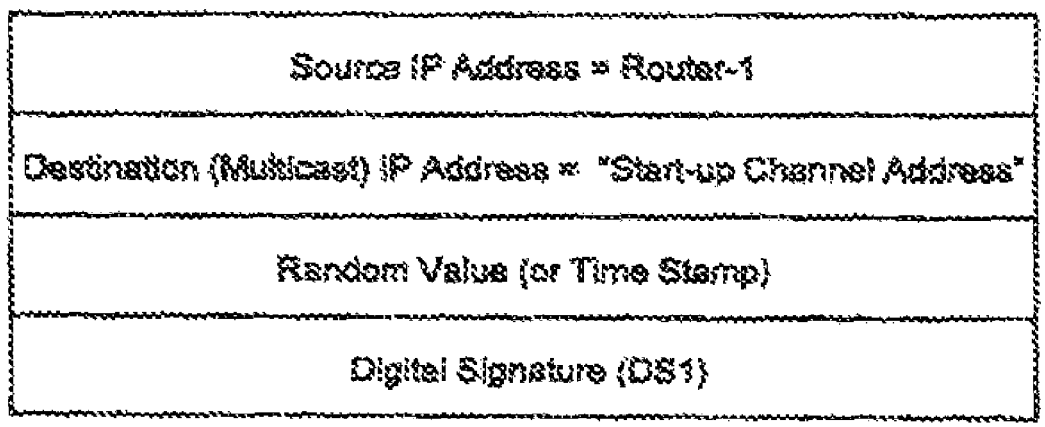
FIG. 3 illustrates an example of a format depicting parts of a startup message, in particular of the header of a startup message, according to an embodiment of the invention.

If the started OSPF process or node does not receive any message on the "Start-up" channel, then it sends a "jump-start" (Message 1) signed by the node's private key as shown in FIGS. 2 and 3. The "jump-start" message or packet is a multicast message. Other nodes that are active, for instance have just started, will receive this message.

FIG. 3 illustrates an embodiment of such a packet or message which may be called a jump-start message (or packet), live-lock breaking message (or packet), or OSPF "Start-up" channel message. This multicast message, and message exchange, helps the OSPF nodes in a shared segment to identify the neighboring peers.

For example, if routers R1 and R2 are assigned as the two OSPF nodes, the first router R2 starts and its routing application, e.g. OSPF application, sends a "jump-start" message in the start-up multicast channel (which represents an OSPF Startup Channel). Since there is no other OSPF node active, router R2 will keep on listening on the multicast channel and also sends the start-up packet at regular intervals.

Assume at a later time that Router R1 is booted up (OSPF applications is started at boot-time automatically) and then it will send the OSPF jump start packet in the start-up channel. The key fields in the packet header are shown in FIG. 3 and described below.

When the OSPF application is started in the Router 1 either at boot up or at a later time in the router, it sends a digitally signed packet that is the jump-start packet in the Multicast Start-up session.

As shown in FIG. 3, the jump-start packet may include the fields:
Source IP Address=Router-1,
Destination (Multicast) IP Address="Start-up Channel Address",
Random Value (or Time Stamp), and
Digital Signature (DS1).

The source IP address designates the sending node that is illustrated here in this example as router R1. The destination address is a multicast address designating the multicast channel.

The random value or time stamp may be used for verification of the digital signature DS. The time stamp, if included in the packet, can further be used by other nodes for checking whether a received jump-start packet is a recent packet and not an old packet to be disregarded.

The Router R1 generates the digital signature (DS1), preferably as described below:
DS1=Enc (Source Address, Random Value, Private Key of Router 1).

Router R2 listens on the start-up channel, receives the jump-start packet, and verifies the digital signature DS1 thereof by forming a digital signature DS2 as follows:
DS2=Enc (Source Address, Random Value, Public Key of Router 1).

Router R2 compares the DS1 and DS2 and decides whether Router R1 is valid and accepted by router R2 (and/or other routers receiving the jump-start packet and verifying it similar to router R2), when DS1=DS2.

When DS1 is not equal to DS2, Router R2 (and/or other routers receiving the jump-start message packet and verifying it similar to router 2) decides that Router R1 is not valid and does not accept router R1.

Note that during the installation of routers R1 and R2 valid certificates are installed in each of them. The above case describes a scenario where R1 is joining after R2 and R2 is validating the R1 certificate. Similarly R1 will also need to validate the R2 certificate (if needed).

The above process is repeated when other routers R3 to R6 will start and join the multicast session.

The Session key update process is described as follows. Assume that the designated router (DR) and backup designated router (BDR) are up and running and a new router such as R4 is booted up in the shared segment. The new router R4 will send a jump-start message or packet such as described above and shown in FIG. 3, and establish the SA with DR and BDR.

After this process, the DR will generate a unique session key and distribute it in a session key update message shown in FIG. 4A to the BDR. The BDR upon receipt of this message sends an acknowledgement message, such as shown in FIG. 4B, to the DR which informs the DR that the BDR has received and accepted the session key update message, and will use the updated session key.

FIG. 4 includes FIGS. 4A and 4B and shows a session key update packet or message (FIG. 4A), and a session key update acknowledgement (ACK) packet or message (FIG. 4B).

The session key update packet includes one or more, preferably all of the following fields:
Source IP Address=DR,
Destination IP Address=BDR,
Message Type=Session key update.
Time Stamp, and
Session Key The session key update packet is encrypted. The session key update packet will be sent by the DR not only to the BDR but to all other nodes (joining in the multicast session), using their respective Destination IP Addresses in the Destination IP Address field of the session key update packet.

The session key update ack packet is an acknowledgment, ACK, message, for acknowledging the session key change to the DR from the BDR and/or the individual routers.

As shown in FIG. 4B, the session key update acknowledgment packet includes one or more, preferably all of the following fields:
Source IP Address=BDR,
Destination IP Address=DR,
Message Type=Session key ACK, and
Time Stamp.

When a router such as R4 acknowledges the session key change, the field Source IP Address of course indicates the IP address of this router. The ACK message of FIG. 4B generated and sent by the other routers is the same.

One or preferably both of these new messages, "jump-start" packet and session key update packet, form part of the "Jump-start" mechanism according to an embodiment of the invention. This method is a new way to kick-off the peer routers. The method and system preferably include one or more of the following items:
generation of "jump-start" packet or message,
acknowledgment of such a packet,
generation of a session key packet or message (or session key update message), and
acknowledgement of this session key packet.

Further, distribution of the session key by the DR and the BDR is also a feature of the embodiment of the invention.

These messages may use underlying security protocol for e.g., validating the certificates, generating authentication packet etc.

According to one embodiment the designated router DR is the only active node. In this embodiment, when the DR is the only router in that segment, the DR after sending the message 1 as shown in FIG. 2, if the DR does not receive any other "jump-start" message from other OSPF nodes R1 to R6, BDR, decides and declares that it is the only available node in the segment. The DR uses its public/private key pair and determines a random session key. This session key can be generated by several schemes. One possible way is to generate the key as follows: Key=Hash(Random Number, private Key, Public Key, TimeStamp).

This key is used as credential and is applied on the hello packet either for authentication or encryption (message 2). No other nodes will be able to read or decrypt the packet. Another possibility is to sign using the private key of the node and then generate the hello packet. Using the private key to generate hello packet may be time consuming since there is no other nodes. A better way may be to generate session keys.

In one embodiment, the BDR or other nodes join the shared segment, that is these nodes are active nodes. Later when the BDR router is started, the OSPF application in the BDR performs the same procedure like the DR as described above. Namely, the BDR waits for a certain amount of time and then sends a "Jump-start" packet on the startup-channel. Since the DR is now still listening on the "start-up" channel, the DR validates the BDR's signed message (issued by a single administrative authority). Then the DR and the BDR engage in Internet Key Exchange (IKE) to generate two SA's (message 3). One SA is for unicast communication that is conducted between the DR and the BR, and another SA is for multicast communications that can be used for hello packet and LSA updates etc.

According to the group communication mechanism, if a node joins a group or a node leaves a group, the group-keys have to be changed and new keys have to be distributed. In this situation, the DR was using its self generated keys to send hello packet. Now the BDR has joined and it has generated a new session key for multicast channel. The BDR uses that key and generates the hello packet and LSA updates etc.

Now if Router R4 starts, it sends a "jump-start" message, which the BDR and DR will receive. Both the BDR and DR are engaged in the Internet Key Exchange (IKE) with the R4 (messages 4 and 5) to generate a unicast SA for the DR-R4 and BR-R4 communication. Apart from this, the DR also generates a new session key (for multicast) during the same message exchange 4; it then informs the BDR about the new group key using the unicast SA (DR-BDR), such as shown in FIGS. 4A, 4B. This way any new nodes which come and join the OSPF network will receive a new session key. It is the responsibility of the DR to generate a new group key and distribute to all other nodes.

If more and more OSPF nodes are joining, then the DR generates a new group key and distributes it first to the BDR, then the BDR and DR can evenly distribute it to all other nodes. For example if one hundred OSPF nodes are present in a shared LAN, the BDR will distribute to the new group key to the first fifty nodes then the DR will distribute the new group key to the other fifty nodes. This reduces the distribution time and speeds up the operation.

Overall the DR and BDR may be responsible for generating the SA messages for unicast communication. The DR is also responsible for generating the group-key and the DR has to distribute the group-key to the BDR first. Depending on the number of nodes, both the BDR and DR co-operatively distribute this group key to other OSPF routers using the respective unicast SA messages. The group-keys are refreshed periodically and the same keys can be used for both inbound and outbound because in the OSPF all the routers are clients and also server for generating the multicast message.

According to the embodiments of the invention, the DR generates a session key also if it has decided that it is the only available node in the segment. Further, if a new node joins then keys are generated again.

This feature contributes to increase the security against attacks. Basically, for example, most of the security devices have two keys, one key is a short term key and another key is a long term key. The long term key is kept within the router (pair of public key and private key and/or long term secret-key).

Consider a case where only one secret key would be provided in the router, and that key is being used for secret communication. An attacker may sniff the traffic and store those packets. At a later time, the attacker can perform some off-line analysis on those stored packet and may be able to retrieve the keys. If the attacker should succeed, that particular long term key and thus the whole system is now compromised. Typically the life time of the keys may vary from several months to several years in the Internet. So when an attacker extracts those keys, attacks are possible which may damage the system.

To avoid this, long-term keys are used as secrets and stored only within the device. Using the long-term key, most of the short-term keys are derived. The life-time of the short term key is valid only for that session. Security protocol derives the short-term key from the long term key in an irreversible manner, meaning that there is no relation between the long term key and the short term key.

Each time the short term key will be different and will confuse an attacker who is sniffing those packets. In addition to this the short term keys are also refreshed periodically at regular intervals. This is called as "re-keying mechanism". This completion protection scheme is called "Perfect Forward Secrecy".

In the present embodiments, if the DR is the only router, it performs two tasks. First, it sends periodic Hello messages in the normal OSPF multicast channel and for this it uses a Short term key that is derived from the long term key (public/private key) pair. This is because if some other OSPF node is plugged in, it will see the hello packet with authentication header fields and it will not be able to decode and hence cannot participate in the secured-OSPF communication.

Second, the DR periodically sends the "jump-start" message in the start-up channel digitally signed by its private key.

The above features of the mechanism and functions are applicable to most of the network elements in a routing system, preferably in the Internet, and are also applicable to the service and middle box equipments like routers, especially 3G-infrastructure network elements.

Although preferred embodiments have been described above, the invention is not limited thereto and may also be implemented in other ways, e.g. by combining, in any arbitrary fashion, one or more features of one or more embodiments with one or more features of other embodiments.

What is claimed is:

1. A method for communicating among a plurality of nodes in a shared network using at least three multicast channels having respective associated multicast addresses, the method comprising:
monitoring, by a sending node of the plurality of nodes, a third multicast channel of the at least three multicast channels;
sending, by the sending node, a jump-start message, corresponding to the sending node starting an operation or application, to at least one other of the plurality of nodes, in response to detecting no message on the third multicast channel; and
exchanging regular start-up messages including at least a hello packet and a link state advertisement (LSA) summary using first and second multicast channels of the at least three multicast channels.

2. The method according to claim 1, wherein monitoring comprises monitoring the third multicast channel by the sending node for a predefined time to determine whether messages are sent on the third multicast channel prior to sending the jump-start message from the sending node.

3. The method according to claim 1, wherein sending the jump-start message comprises signing or encrypting by the sending node the jump-start message using a key before sending the jump-start message.

4. The method according to claim 3, wherein the key comprises a private key of the sending node.

5. The method according to claim 1, wherein the sending node is configured to start the application comprising an Open Shortest Path First protocol, in response to causing the one of the plurality of nodes to send the jump-start message.

6. The method according to claim 1, wherein the plurality of nodes comprise routers including a Designated Router and other routers, and the method further comprising:
determining that the Designated Router comprises an only available node in the shared network segment if the Designated Router does not detect a jump-start message from at least one of the other nodes when monitoring the third multicast channel; and
generating a session key for at least one of authenticating or encrypting a further message by the Designated Router on another multicast channel when the Designated Router comprises an only active node in the shared network segment.

7. The method according to claim 6, wherein said generating comprises using a public/private key pair of the Designated Router for generating the session key for at least one of authenticating or encrypting the further message.

8. The method according to claim 6, wherein said generating comprises generating the session key as a function of a Random Number, a private key, a public key, and a TimeStamp.

9. The method according to claim 1, wherein the nodes comprise routers including a Designated Router, a Backup Designated Router and other routers, the method further comprising:
engaging the Designated Router and the Backup Designated Router in an Internet Key Exchange with a new node to generate a unicast security association between the new node and the Designated Router and between the new node and the Backup Designated Router when a start message is sent from the new node and both the Designated Router and the Backup Designated Router are active;
generating, using the Designated Router, a new session key for multicast communications; and
informing, using the Designated Router, the Backup Designated Router of the new session key using the unicast security association for communications between the Designated Router and the Backup Designated Router.

10. The method according to claim 1, further comprising:
generating a new session key for new nodes which connect and join an Open Shortest Path First network.

11. The method according to claim 1, further comprising:
providing a group communication mechanism, when a new node joins a group, an existing node leaves a group, group keys are changed, session keys are changed or new keys are distributed.

12. A method for communicating among a plurality of nodes in a shared network using at least three multicast channels having respective associated multicast addresses, the method comprising:
receiving a jump-start message, corresponding to a sending node of the plurality of nodes starting an operation or application, at least one other of the plurality of nodes, in response to the sending node not detecting any messages on a third multicast channel, of the at least three multicast channels, wherein the jump-start message is secured by the sending node;
validating the secured jump-start message by a receiving node in response to the receiving node receiving the jump-start message on the third multicast channel;
engaging in an Internet Key Exchange between the receiving node and the sending node to generate security associations; and
exchanging regular start-up messages including at least a hello packet and a link state advertisement (LSA) summary using first and second multicast channels of the at least three multicast channels.

13. The method according to claim 12, wherein the engaging comprises using one of the security associations for unicast communication between the nodes, and using another one of the security associations for multicast communication.

14. The method according to claim 12, further comprising:
generating a new session key for new nodes which connect and join an Open Shortest Path First network.

15. The method according to claim 12, further comprising:
providing a group communication mechanism, when a new node joins a group, an existing node leaves a group, group keys are changed, session keys are changed or new keys are distributed.

* * * * *

UNITED STATES PATENT AND TRADEMARK OFFICE
CERTIFICATE OF CORRECTION

PATENT NO. : 8,145,901 B2
APPLICATION NO. : 12/839043
DATED : March 27, 2012
INVENTOR(S) : Lakshmi Narayanan It is certified that error appears in the above-identified patent and that said Letters Patent is hereby corrected as shown below:

On Page 2, in Field (56), under "OTHER PUBLICATIONS", in Column 1, Line 6, delete "2007:," and insert -- 2007, --, therefor.

On Page 2, in Field (56), under "OTHER PUBLICATIONS", in Column 1, Line 14, delete "22." and insert -- 22296>. --, therefor.

In Column 6, Line 65, delete "update." and insert -- update, --, therefor.

In Column 6, Line 67, delete "Session Key" and insert -- Session Key. --, therefor.

In Column 7, Line 45, delete "private" and insert -- Private --, therefor.

In Column 7, Line 65, delete "BR," and insert -- BDR, --, therefor.

In Column 8, Line 13, delete "BR-R4" and insert -- BDR-R4 --, therefor.

In Column 10, Line 51, in Claim 12, delete "channel," and insert -- channel --, therefor.

Signed and Sealed this
Eleventh Day of September, 2012

David J. Kappos
*Director of the United States Patent and Trademark Office*